Figure 1:
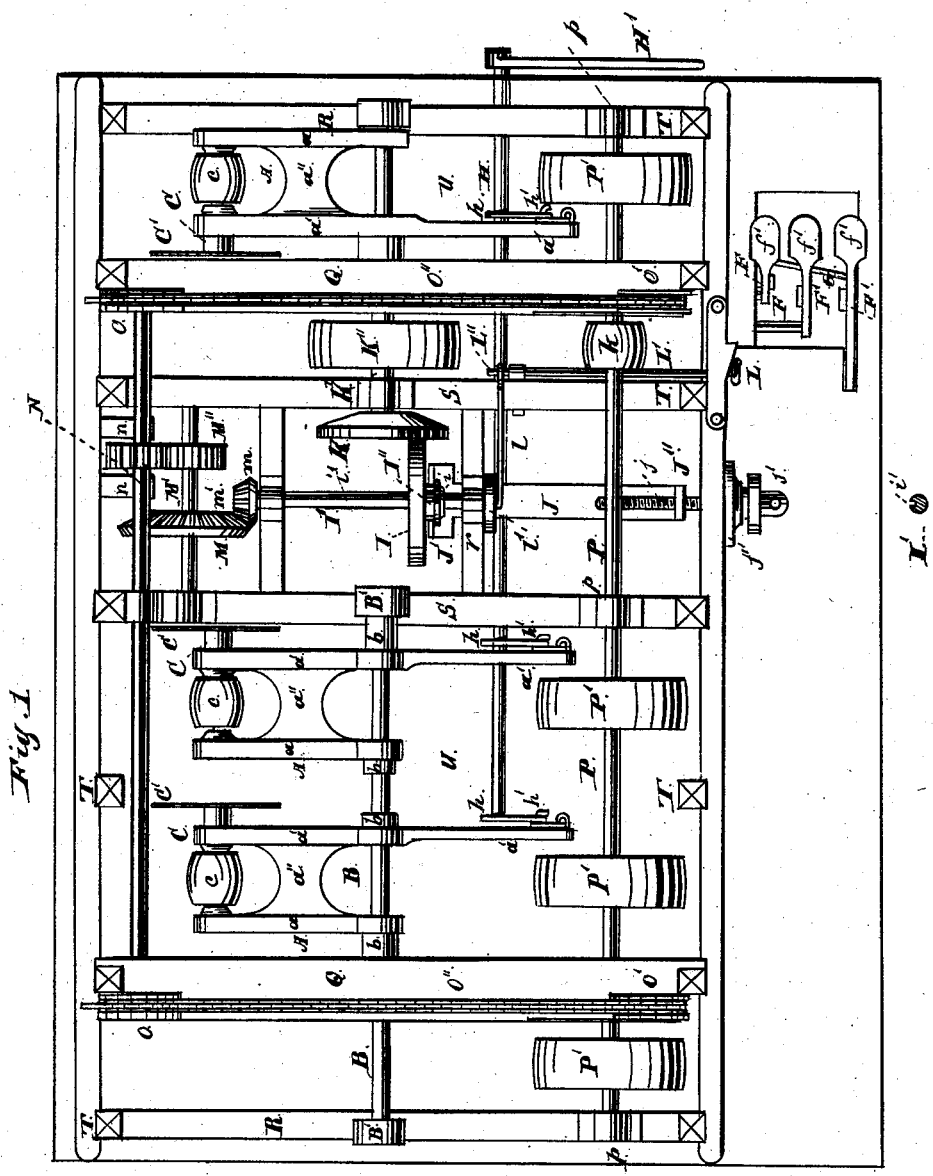

(No Model.) 4 Sheets—Sheet 1.

F. McDONOUGH.
MACHINE FOR TRIMMING AND CUTTING LUMBER.

No. 259,702. Patented June 20, 1882.

Witnesses:
Albert H. Adams
Edgar T. Bond

Inventor:
Frank McDonough
By West & Bond Attys

N. PETERS, Photo-Lithographer, Washington, D. C.

(No Model.) 4 Sheets—Sheet 2.
F. McDONOUGH.
MACHINE FOR TRIMMING AND CUTTING LUMBER.
No. 259,702. Patented June 20, 1882.
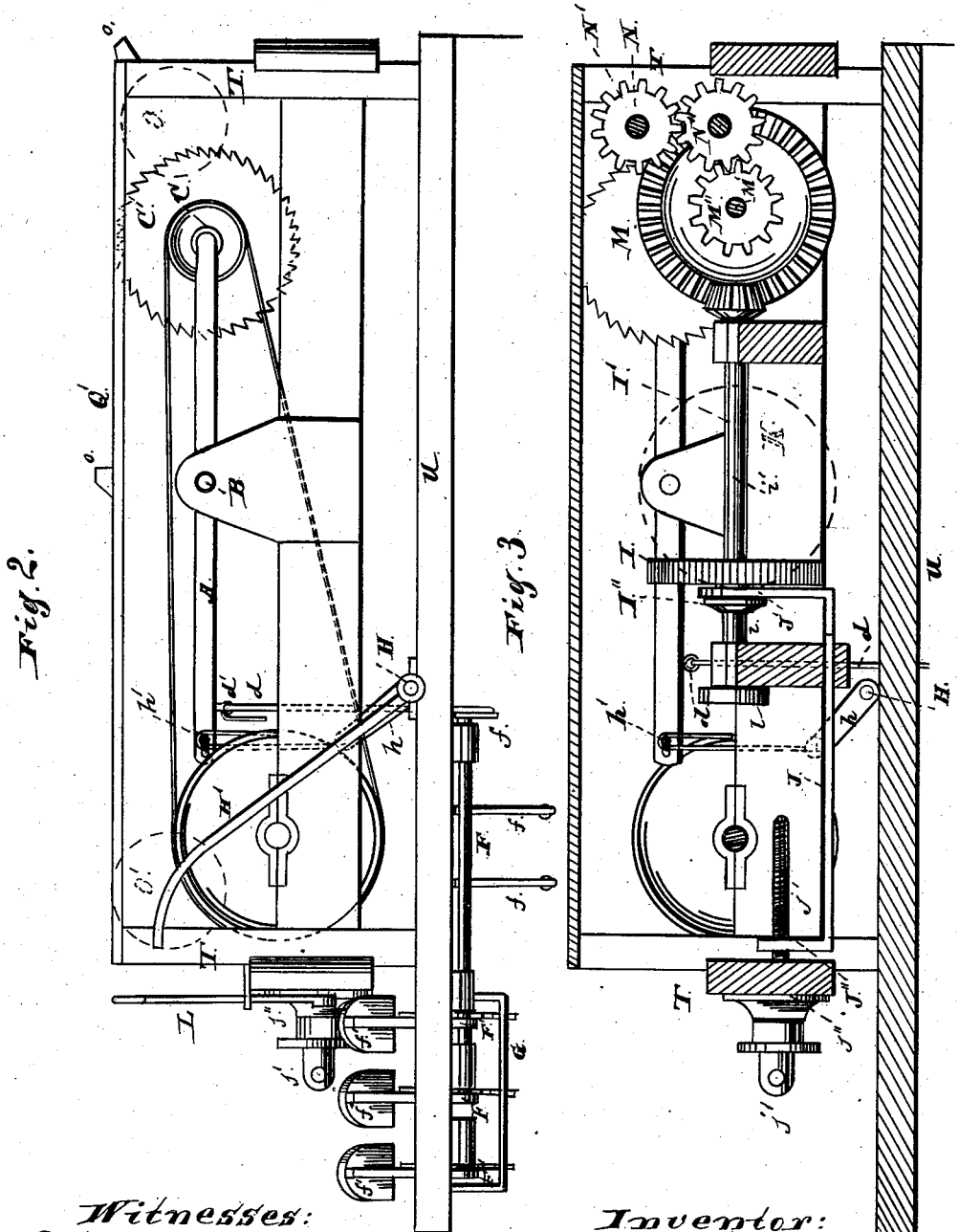

(No Model.)  4 Sheets—Sheet 3.
F. McDONOUGH.
MACHINE FOR TRIMMING AND CUTTING LUMBER.
No. 259,702.  Patented June 20, 1882.
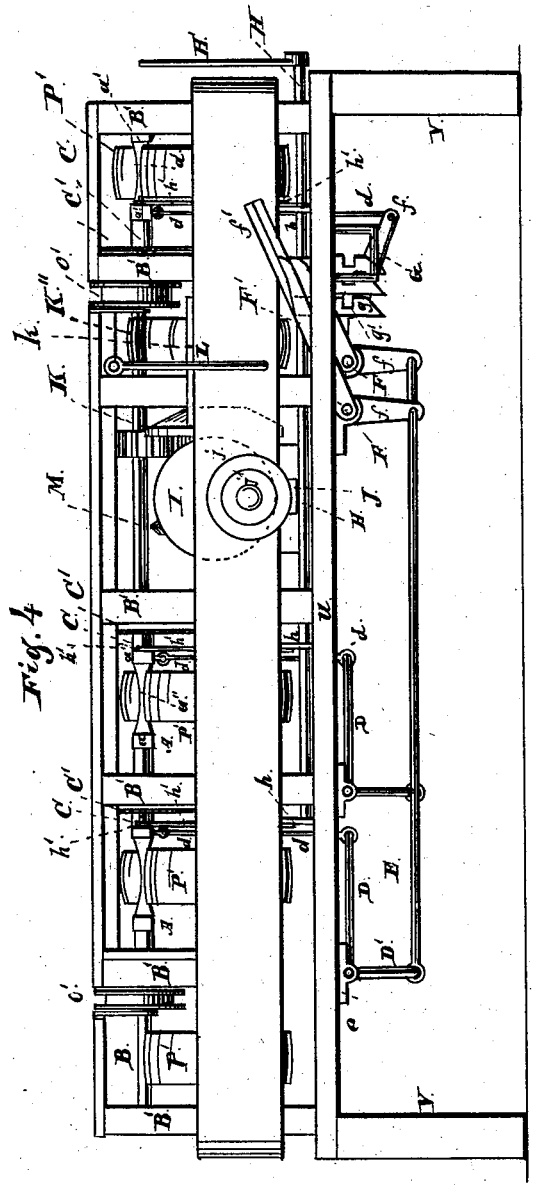
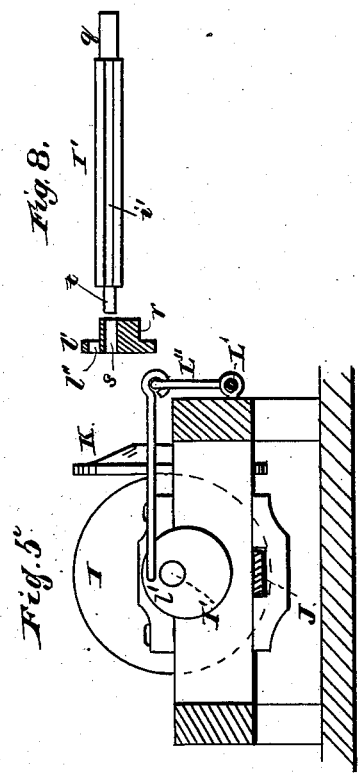
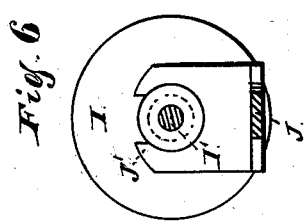

(No Model.) 4 Sheets—Sheet 4.
F. McDONOUGH.
MACHINE FOR TRIMMING AND CUTTING LUMBER.
No. 259,702. Patented June 20, 1882.
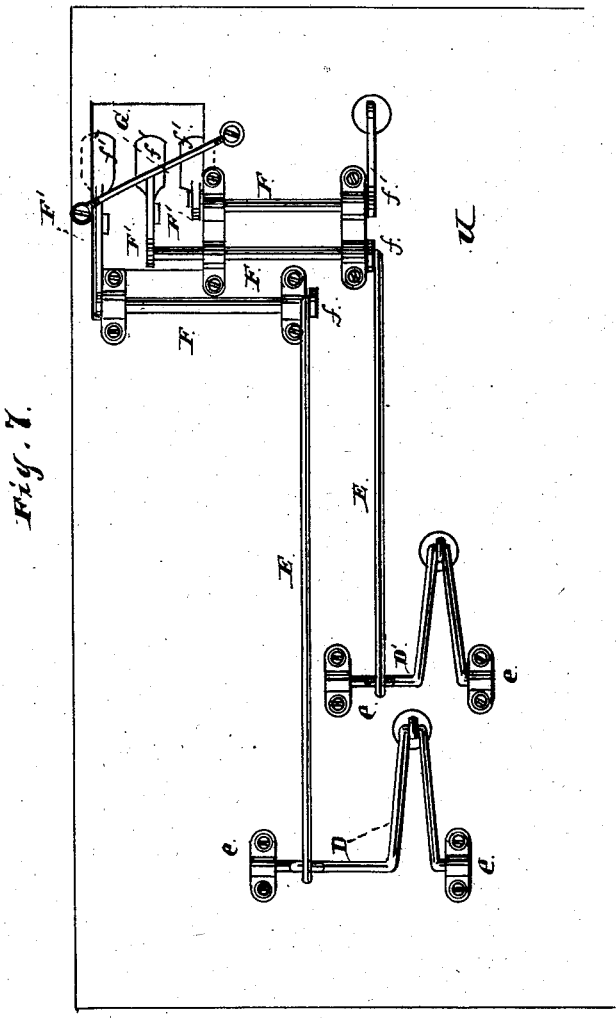
Witnesses: Albert N. Adams. Edgar P. Bond.
Inventor: Frank McDonough By West & Bond Attys

UNITED STATES PATENT OFFICE.

FRANK McDONOUGH, OF EAU CLAIRE, WISCONSIN.

MACHINE FOR TRIMMING AND CUTTING LUMBER.

SPECIFICATION forming part of Letters Patent No. 259,702, dated June 20, 1882.

Application filed September 10, 1881. (No model.)

*To all whom it may concern:*

Be it known that, FRANK McDONOUGH, residing at Eau Claire, in the county of Eau Claire and State of Wisconsin, a citizen of the United States, have invented new and useful Improvements in Machines for Trimming and Cutting Lumber, of which the following is a full description, reference being had to the accompanying drawings, in which—

Figure 1 is a top or plan view; Fig. 2, an end elevation; Fig. 3, a transverse section, showing the driving and feeding mechanism; Fig. 4, a front side elevation; Fig. 5, a detail showing the friction-receiving disk or wheel and the friction-wheel and its operating devices; Fig. 6, a detail showing the friction wheel or disk and its attachment to its operating-bar; Fig. 7, a detail, being an under view, showing the arrangement of the devices for lifting each saw independently. Fig. 8 is a section through the disk $I'$ and a portion of the shaft I, which is journaled eccentrically in the same.

This invention relates to machines for trimming the ends of lumber and cutting edges or pieces of lumber into strips of given length to be used for various purposes, and has for its objects to construct a machine for the purposes designated which will do the work effectually and in a reliable manner, and which can be easily and quickly changed to do the work of trimming or the work of cutting edges or pieces into strips of given length without changing of the machine as a whole or removal of any of the parts, and at the same time have the parts constituting the machine simple in construction, easily operated, and capable of being changed in respect to the feed to adapt it for the kind of work which is being done, and so arranged as to carry and operate a number of saws and have the saws capable of being all thrown into action simultaneously in cutting material into given lengths, or have one saw or as many saws as may be desired thrown into action independently of the remaining saws and of each other without disconnecting the driving mechanism or any of the parts composing the machine as a whole, the arrangement being such that any one saw can be brought into action without having the other saws act; or all the saws or any number of the saws can be brought into action, as desired. These objects I attain by means of the mechanism illustrated in the drawings, in which—

A represents the frame of the saws; B, the shaft on which the frames are mounted or pivoted; C, the saw arbors or shafts; C', the saws; D D', the independent cranks; E, the connecting-links; F, the crank-shaft; F', the arm or lever for operating the crank-shaft; G, the locking-bar; H, the rock-shaft; H', the lever or arm for operating the rock-shaft H; I, the friction-producing disk; I', the revolving shaft, carrying the disk I; I'', the grooved collar on the disk I; J, the sliding bar; J', the fork on the bar J, connecting the bar with the disk I; J'', the upturned end of the bar J, through which the bar is adjusted; K, the friction-receiving disk; K', the shaft of the main driving-pulley; K'', the main driving-pulley; L, the arm or lever for adjusting the friction-disk I; L', the shaft of the lever L; L'', the crank at the end of the shaft L'; M, the beveled-gear wheel; M', the shaft carrying the wheel M; M'', the gear-wheel on the shaft M'; N, the secondary shaft; N', the gear-wheel on the shaft N; N'', the gear-wheel forming an idler between the wheels M'' N'; O O', the sprocket-wheels; O'', the feed-chains; P, the pulley-shafts; P', the pulleys; Q R, the cross-bars of the frame-work; S, the frame-pieces supporting the feed mechanism; T, the uprights or posts of the frame; U, the dividing-board, to which the rock-shaft and the independent cranks and devices are connected or attached; V, the supports for the machine; $a$ $a'$ $a''$, the parts composing the frames A; $b$, the collars or washers for holding the frames in position on the shaft B; $c$, the pulley on the saw journals or shafts; $d$, the link connecting a crank-arm, D, with its saw-frame; $d'$, the hook connecting the link $d$ with the saw-frame; $e$, the journals or bearings for the crank-arms D D'; $f$, the crank on the shaft F; $f'$, the foot-treadles on the arms or levers F'; $h$, the cranks on the rock-shaft H; $h'$, the links or bars connecting the cranks $h$ with the saw-frames; $i$, the pin in the collar I''; $i'$, the groove in the shaft I'; $j$, the adjusting-screw; $j'$, the head of the adjusting-screw; $j''$, the bearing-plate for the head $j'$; $k$, the pulley on the shaft P, over which the belt from the pulley K'' passes; $l$, the link connecting the crank or arm L'' with the disk on the shaft I'; $l'$, the disk on the shaft I'; $m$, the bevel-pinion on the end of the shaft I'; $m'$, the beveled gear on the wheel M; $n$, the posts or uprights supporting the shaft of the idler N''; $o$, the teeth on the chains O; $p$, the bearings for the shaft P.

The frames A may each be made of wood or other suitable material, and may be constructed, as shown, of two side pieces united by a suitable center piece, or in any other suitable manner, the forward end having an opening for the reception of the pulley through which the saw is driven, which pulley is located on the saw shaft or arbor C, which is journaled in any suitable manner in the forward end of the side pieces, and has attached to its end the saw C', of any of the usual and well-known forms of construction, the saw being attached to the arbor or shaft, as usual. These frames are mounted pivotally on a shaft, B, which shaft has its bearings or is supported in suitable standards, B', extending up from the cross-pieces of the frame, and the saw-frames A are held in position on the shaft and prevented from coming in contact one with the other by suitable collars or washers, $b$, formed or located on the shaft B. The shaft B is stationary, and the frames turn or swing thereon as a pivot; and, in order to turn or swing the frames, one of the side pieces, $a'$, as shown, is made longer than the other side piece, and extends beyond the shaft and forms an arm or lever by which the end carrying the saw is raised and lowered.

The outer end of the arm or extension of the side piece $a'$ has attached thereto the upper end of a link or rod, $d$, which end, as shown, is in the form of an elongated hook, and is attached to the arm or extension by means of an eye or staple, $d'$, so that the link $d$ is free to slide, and at the same time it will not become disconnected; but this attachment can be made in some other suitable manner, and, in place of a round or other form of link or rod $d$ having a hook thereon, a flat plate or bar provided with an elongated slot and attached by a bolt, rivet, or otherwise can be used.

The lower end of the link $d$ is attached to or connected with a crank-arm, D, which arm stands at right angles, or nearly so, with a second crank-arm, D', both arms being formed or connected together in any suitable manner, and having journals or bearing portions which enter suitable bearings, $e$, secured to the under side of the bed or bottom $u$, so that the cranks D and D' are free to turn or swing on their pivots or journals. As shown, these cranks are formed from a single piece bent into shape to have a main portion or body, from which the cranks extend at right angles, or nearly so, to each other; but the main portion or body may be an independent piece, with the arms or cranks D D' secured thereto and extending out therefrom in the proper manner. One of these cranks D D' is to be provided for each saw-frame, and to the end of the crank or arm D' is attached or connected the end of a link, E, the other end of which is attached in any suitable manner to the end of an arm, $f$, located on the shaft F, which shaft is mounted so as to turn freely in suitable bearings secured to the under side of the bed or bottom $u$, a shaft and an arm located thereon being provided for each crank D D', so that the respective cranks can be operated independently.

On each shaft F is located an arm or lever, F', which extends out and above the bottom $u$, as shown, and has on its outer end a foot-piece, $f''$, on which the foot can be placed to operate the arm or lever F' and turn the shaft to raise or lower the frame connected therewith through the crank D D' and the connecting-rod E.

Depending from each lever or arm F' is a hook, $g$, which is pivoted to the arm or lever at its upper end, so as to swing, and has its lower end provided with a notch or recess to receive the rod or bar G, which is attached in any suitable manner to the under face of the bottom $u$, and in such relation to the hooks $g$ and the arms or levers that when any one of the arms or levers F' is depressed the hook can be made to engage with the rod and hold the arm or lever in its depressed position, by which means the saw, which is operated through such arm or lever, will be held in a raised position and in position for use. Some other means than the hooks $g$ and rods G can be used for this purpose so long as such devices will allow the arms or levers to operate independently, and at the same time permit of their being locked when so desired.

By mounting each saw in the end of a tilting or rocking frame, and having such end capable of being raised or lowered at the will of the operator and independently of the other frames carrying the remaining saws, it will be seen that any one saw can be raised whenever desired, leaving the remaining saws depressed and out of action, or that two saws at a greater distance apart can be raised so as to be brought in action, so that the ends of boards of various lengths can be trimmed by bringing the proper saw into use; or both ends can be trimmed simultaneously, if so desired, by raising the saws nearest to each end of the board. Each saw is raised independently through its foot-treadle F', crank-shaft F, connecting-rod E, double crank D D', and link or rod $d$, connected to the arm or extension of the frame, and when the foot is removed from the treadle the several devices will return to their normal condition and the saw will drop below the bed or body of the machine, out of position for use.

Instead of using foot-treadles, as shown, the crank-shafts may each be operated by a hand-lever suitably arranged for the purpose so long as such devices will act to raise any one saw independent of the other saws. As many saws are to be used as desired. As shown, three saws are provided, mounted in independent frames. As many more may be used as the capacity or size of the machine will permit, such other saws being each mounted in an independent frame and supported on a shaft corresponding to the shaft B or an extension of such shaft.

As shown, the shaft B is divided to permit of the insertion and operation of the feeding mechanism, and the end saw is mounted in a frame having no corresponding frames arranged adjacent thereto; but such feeding mechanism might be arranged near the center of the machine and other frames with saws thereon arranged adjacent to the end frame and saw at the end of the machine, where the operator, in the form of construction shown, stands to operate the several devices.

Above the division board or bottom $u$, and mounted in suitable bearings secured to the upper face of such bottom, is located the shaft H, at the outer end of which is a hand-lever, H', and on the body of which, in line with each of the arms or extensions of the several saw-frames, is located an arm, $h$, the outer end of which has pivoted or attached thereto the end of a link, $h'$, the other end of which is pivoted or attached in any suitable manner to the outer end of the arm or extension of the saw-frame, with which the arm $h$ coincides. These arms $h$ are rigidly secured to the shaft H, and by rocking this shaft through the arm or lever H' it will be seen that all the frames carrying the saws will be simultaneously raised or lowered, accordingly as the crank-shaft is rocked to depress the arms $h$ or return them to their normal position, so that the operator can simultaneously and instantaneously elevate all of the saws into working position. This elevation of the saws is for the purpose of cutting edges or pieces into strips of equal length, the length depending upon the distance at which the saws are set apart, and by this simultaneous raising of the saws it will be seen that the pieces or edges are all cut at one and the same time into strips of corresponding length, thereby saving the time and trouble which would be necessary in case each saw was independently brought into action to do its work and the material again receded and advanced for the next saw to do its work, and so on, as by a single operation of the lever or arm H' all the saws can be brought into position for work.

The friction wheel or disk I is mounted upon a shaft, I', and arranged in such relation to the friction disk or wheel K, mounted upon the shaft or journal K', as that the periphery of the wheel or disk I can be readily brought into contact or be in contact with the face of the wheel or disk K. This wheel or disk I is adjustable upon the shaft I', and is locked in position thereon so as to be adjustable by means of a pin, $i$, which passes through the collar or hub I'' into the groove $i'$, extending the longitudinal length of the shaft; or it may be attached so as to be adjustable by means of a spline, or in some other suitable manner.

The collar I'' is provided with a groove or recess, into which the forks or sides of the end or fork J' of the bar J enter, so as to connect the bar and wheel or disk together and not interfere with the revolution of the shaft I'. The bar J is supported in suitable bearings located on the frame-work of the machine, and is adjustable in such bearings, its end J'' being provided with a screw-threaded opening to receive the shank of an adjusting-screw, $j$, the head $j'$ of which is located outside of the frame-work of the machine, and is adapted to be turned forward or back, as required, to move the bar J in or out to adjust the wheel or disk I on the shaft I' in relation to the wheel or disk K, and in order to prevent the head $j'$ from wearing or injuring the frame a guard-plate, $j''$, as shown, is provided, against which the end of the head bears in use.

The wheel or disk K is stationary, and by moving or adjusting the wheel or disk I to or from the center of the wheel or disk K the rotation of the parts can be adjusted to give a slow or fast speed, as required, for the feed, the adjustment of the wheel or disk I near the center of the wheel or disk K producing a slow rotation, and its adjustment near the periphery of the wheel or disk K producing a fast rotation, the intermediate adjustment producing a corresponding rotation, accordingly as the wheel works or bears at a given point on the face of the wheel or disk K. Adjusting the wheel or disk I to bear on the side of the wheel or disk K toward the front of the machine, where the operator stands, will produce a forward feed or a feed in the direction to carry the stuff to the saws, and adjusting this wheel or disk I to bear on the opposite side of the center of the wheel or disk K will produce a backward feed, or a feed which will carry the material away from the saws. By this arrangement of the friction-disks it will be seen that the feed can be changed to slow or fast, as required, without any time or labor being spent in adjusting the devices, all that is necessary to be done being to change the position of the wheel or disk I forward or back in relation to the center of the wheel or disk K through the sliding bar J and adjusting-screw $j$; and it will also be seen that by means of these wheels or disks I and K a forward and backward feed can be quickly and readily produced by adjusting the wheel or disk I to bear on one side or the other of the center of the disk or wheel K, which can be done in the same manner as adjusting the amount of speed through the bar J and adjusting-screw $j$.

The shaft I' extends beyond the disk or collar I'' and projects through a suitable bearing located on a cross-piece of the frame-work, and to this projecting end is attached a small disk, l', at one side of the center of which is connected or attached one end of the link or rod l, the other end of which is connected or attached to an arm or crank, L″, on a shaft, L′, mounted in suitable bearings on the cross-piece S of the frame-work, on the other end of which shaft is an arm or lever, L, by means of which the shaft L′ can be turned or rocked in its bearings and turn the disk l so as to draw the friction-disk I against the friction-receiving disk.

The disk l′ is provided with a hub or boss, r, which is arranged in a bearing formed by means of a suitable strap or bar, r′, so that the hub can turn therein. The journal end t of the shaft I′ enters an opening, l″, formed through the hub and disk eccentrically to the axis of the same, so that by operating the rod l so as to turn the disk the shaft I′ will be shifted toward or away from the disk K according to the direction in which the rod is moved, thus bringing the disk I in contact with disk K or moving it away from the same. In this way the pressure of the disk I upon disk K can be regulated, and hence the proper degree of frictional contact between the two insured. Any form of locking device can be employed for locking the rod l‴.

On the opposite end of the shaft I′ to the disk l′ is a beveled-gear pinion, m, which meshes with the cogs or leaves m′ on the wheel M, which wheel is mounted upon the shaft M′, which is supported in suitable bearings located on the cross-pieces S in such manner as to revolve freely. On this shaft M′ is a gear-wheel, M″, the cogs or leaves of which mesh with the cogs or leaves of a wheel, N″, suitably journaled in posts or uprights n, which wheel in turn meshes with a wheel, N′, on a driving-shaft, N, which shaft has its bearings in the uprights or posts T. On this shaft N are located sprocket-wheels O, over which and corresponding sprocket-wheel, O′, suitably journaled in the front end of the upper cross-bars, Q, of the frame-work, a chain, O″, passes, which chain is provided with teeth arranged at suitable distances apart, which engage with the lumber or strips and advance the same to the saws. The chains O″ are given a forward movement when the friction-disk I is engaged with the friction-disk K forward of its center, as shown in Fig. 1, such engagement of the disk revolving the shaft I′, and, through the pinion m and wheel M, revolving the shaft M′, and with it the wheel M″, which wheel, meshing with the wheel N″, revolves such wheel, and through the engagement thereof turns the wheel N′ in a forward direction, and with it the shaft N, through which shaft the sprocket-wheels are revolved, carrying the chain O″ around with them.

Other forms of mechanism than the wheels, shafts, and chains may be used for advancing the lumber or material to the saws so long as the devices constituting the carrying mechanism can be operated through the action of the friction-disks, and other forms of devices than the friction-disks and mechanism operated therefrom to carry the lumber or material forward to the saws may be used in connection with the tilting saw-frames carrying the saws.

The driving-pulley K″ is suitably mounted upon the shaft K′, which carries the friction-disk K, and over this pulley K″ and a smaller pulley, k, located on the shaft P, a suitable driving-belt passes, through which the shaft P is rotated. This shaft P is mounted in suitable bearings located on the frame-work of the machine, and on which, at the proper point to be in line with the pulleys c, are located the pulleys P′, one for each pulley c, over which pulley P′ and its corresponding pulley c a suitable belt passes, by means of which the pulley c is rotated and the saw C′ driven. There are as many pulleys P′ as there are independent saw-carrying frames.

The frame-work may be of any suitable form of construction which will receive and support the operating mechanism. As shown, it consists of side pieces secured to suitable uprights or posts, T, at the front and rear of the machine, and end pieces, R R, located in the same plane, or nearly so, with the side pieces and cross-pieces Q, located on top or at the top of the uprights or posts, which cross-pieces form tracks or guideways for the travel of the chains O″.

The feeding devices are located and supported in a suitable frame-work formed by the cross-pieces S, attached to the posts or uprights, with transverse cross-pieces which form supports for the shaft I′ and the bar J. Other forms of construction for the main frame and for the intermediate frame for the feeding devices may be used, such main frame and intermediate frame being of a proper construction to furnish the support for the several devices.

As shown, the main frame is supported upon the bottom u, to which bottom the operating shafts and cranks for the independent frame are attached, as before described, and this bottom u is supported in any suitable manner by legs or cross-pieces V from the floor or other supports.

A suitable cover is to be provided, as shown in Figs. 2 and 3, located on the top of the posts or uprights T above the operating mechanism, which cover is to have suitable slots for the passage of the chains and allow the teeth of the chains to project above the plane of the cover, and with other slots located in line with the saws C′ for the passage of the saws when the frames are elevated above the plane of the cover in position to do the work.

In operation, power from an engine or other motive power is to be applied to the machine in any of the usual and well-known manners, imparting the required movements to the several devices to cause each to do their respective work. The chains O″ carry the material forward onto the saws, and when it desired to simply trim the butts the operator places his foot upon the treadle F, which will raise the frame of the saw which is to do the trimming, bringing such saw into position to act and do the work; and if both ends are to be trimmed two of the treadles can be brought into use to bring two of the saws—one at each end of the lumber—into position to act. When it is desired to saw the material into strips of uniform length the operator takes hold of the lever H', and through it and the crank-shaft H raises all of the saws into position for use, so that as the material is carried by the chains onto the saws the saws will act to cut the material into strips of the requisite length. When it is desired to cut strips of greater length than the space between the saws the operator can raise one of the saws into position through its foot-treadle or lever F' and lock it there, and raise another saw at the required distance from the first saw through its foot-treadle or lever F, and either lock it or hold it in position, holding the saws in position to do the cutting. By this form of arrangement it will be seen that the movements of the saws are wholly or entirely under the control of the operator, who can raise them all simultaneously, or can raise any one independently of the others, or any two independently of the others, or can raise each alternate saw, or raise any number of saws, so as bring the saws raised into position for use, while the remainder of the saws will remain below the top or cover and out of use, all of which movements are performed through the arm or lever H' and its connecting devices with the saw-frames, or through the foot-treadles F' and their connecting devices to the saw-frames.

Other means than the sliding bar J and the adjusting-screw $j$ can be used for sliding the wheel or disk I back and forth on the shaft I', and this wheel or disk can be made to engage with the wheel or disk K on the opposite side of its center to that shown in Fig. 1 and give the chains a forward movement, the pulley K'' rotating properly for this purpose.

What I claim as new, and desire to secure by Letters Patent, is—

1. The independent swinging frames A, each carrying a saw and having an arm or extension, in combination with the link or rod $d$, double crank D D', connecting the link E, and crank-shaft F, for raising any one or more of the saws independently of the others, substantially as specified.

2. The independent swinging frames A, each carrying a saw and having an arm or extension, in combination with the link $d$, double crank D D', link or rod E, arm $f$, shaft F, and foot-treadle F', for bringing any one or more of the saws into position for use, substantially as specified.

3. The independent swinging frames A, each carrying a saw and having an arm or extension, in combination with the link $d$, double crank D D', rod or link E, crank-shaft F $f$, foot-treadle F', hook $g$, and rod or bar G, for raising any one or more of the saws into position for use and locking it into position, substantially as specified.

4. The independent frames A, each carrying a saw and having an arm or extension, in combination with the rock-shaft H, having arms $h$, links or bars $h'$, and lever or arm H', for simultaneously raising all of the saws into position for use, substantially as specified.

5. The wheel or disk I, mounted upon the shaft I', journaled eccentrically in disk $l'$, and the connecting-link $l$, in combination with the crank-shaft L'' and L', and lever or arm L, and wheel or disk K, for producing the necessary frictional contact between the disks for feeding purposes, substantially as specified.

FRANK McDONOUGH.

Witnesses:
A. R. BERGH,
A. S. BOSTWICK.